(No Model.)　　　　　　　　　　　　　　　2 Sheets—Sheet 1.
L. MIDDLETON.
CORN PLANTER AND FERTILIZER DISTRIBUTER.
No. 510,698.　　　　　　　　Patented Dec. 12, 1893.
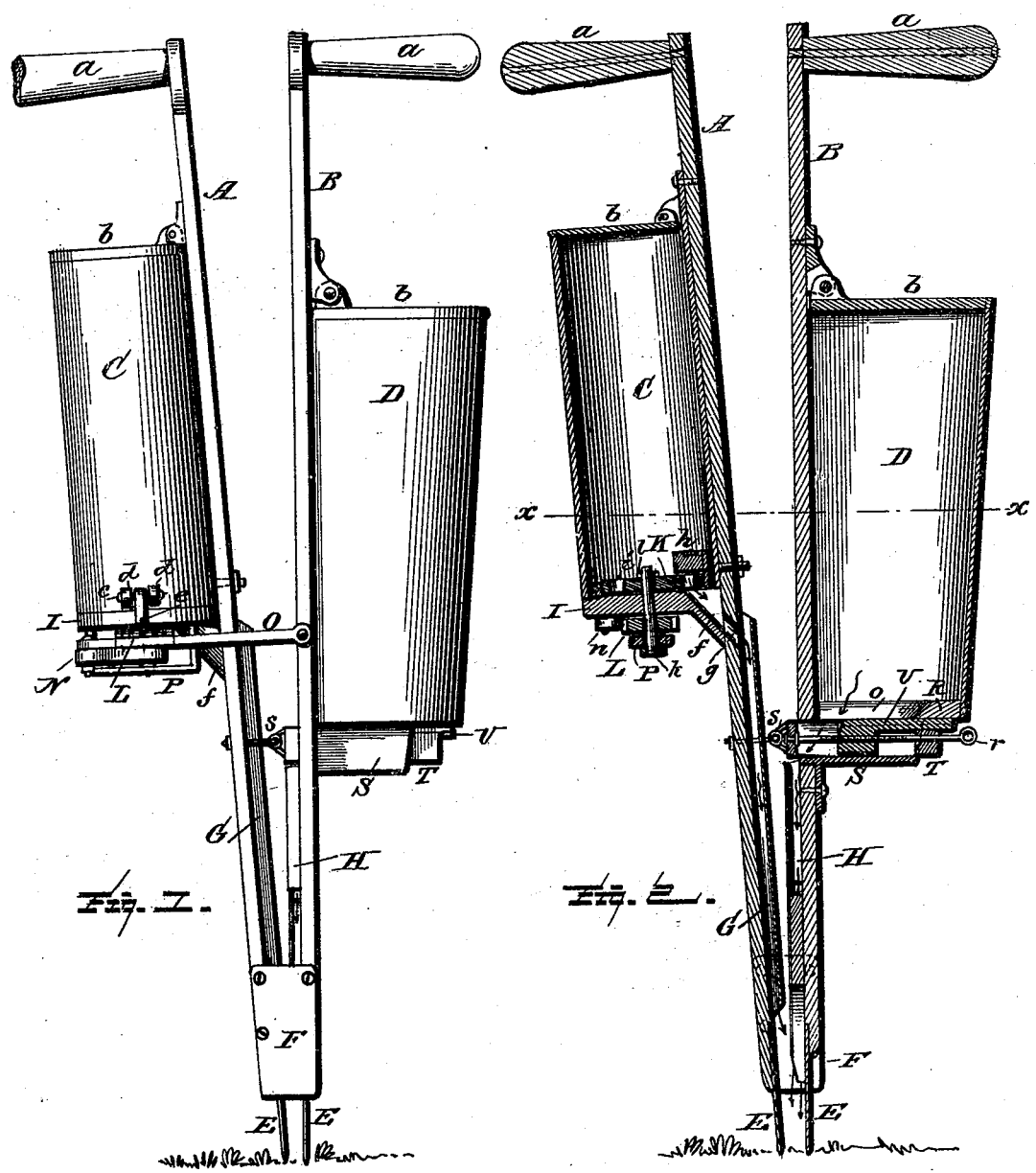

(No Model.) 2 Sheets—Sheet 2.
L. MIDDLETON.
CORN PLANTER AND FERTILIZER DISTRIBUTER.
No. 510,698. Patented Dec. 12, 1893.
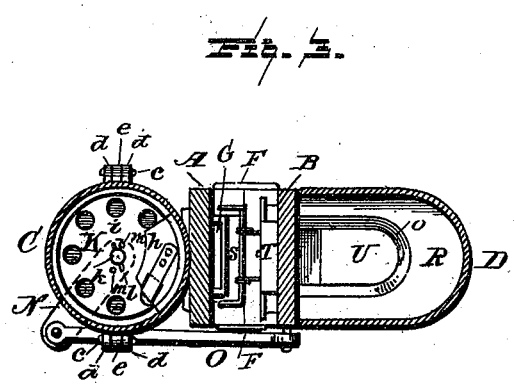
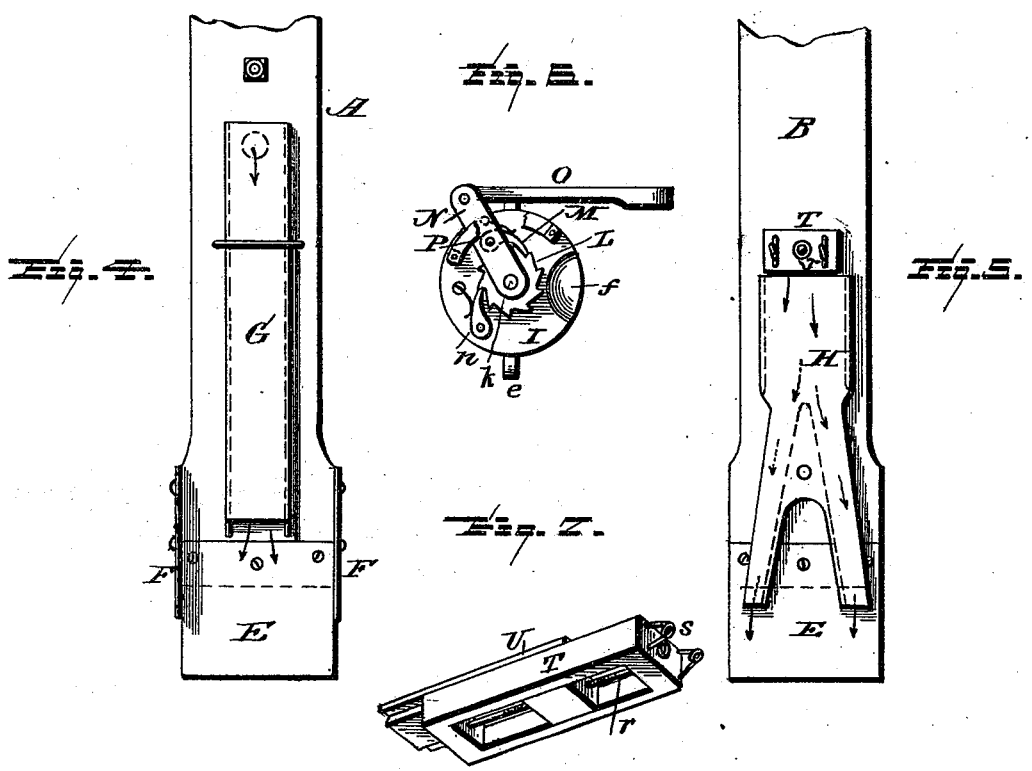
Witnesses
L. C. Hill
G. M. Copenhaver
Inventor
Lee Middleton
per Chas. N. Fowler
Attorney
THE NATIONAL LITHOGRAPHING COMPANY,
WASHINGTON, D. C.

UNITED STATES PATENT OFFICE.

LEE MIDDLETON, OF CLARKSVILLE, MISSOURI.

CORN-PLANTER AND FERTILIZER-DISTRIBUTER.

SPECIFICATION forming part of Letters Patent No. 510,698, dated December 12, 1893.

Application filed February 20, 1893. Serial No. 462,970. (No model.)

*To all whom it may concern:*

Be it known that I, LEE MIDDLETON, a citizen of the United States, residing at Clarksville, in the county of Pike and State of Missouri, have invented certain new and useful Improvements in Corn-Planters and Fertilizer-Distributers; and I do hereby declare that the following is a full, clear, and exact description of the same, reference being had to the annexed drawings, making a part of this specification, and to the letters of reference marked thereon.

The present invention has relation to that class of corn or seed planters and fertilizer distributers in which the seed and fertilizer receptacles are connected respectively to hinged lever arms adapted to be operated by the hands and distribute the corn and fertilizer through the medium of suitable mechanism and the action of the lever-arms.

It is the object of the invention to improve this class of planters and fertilizer distributers whereby the operation will be rendered effective, the details of construction materially simplified and the value of the device greatly enhanced, which several objects I attain by the construction substantially as shown in the drawings and hereinafter described and claimed.

Figure 1 of the drawings represents a side elevation of my improved device; Fig. 2 a longitudinal vertical section thereof; Fig. 3 a horizontal section taken on line $x\ x$ of Fig. 2; Fig. 4 an elevation in detail showing the interior side of a portion of one of the lever-arms and the conductor through which the corn or seed passes from hopper or receptacle; Fig. 5 a similar view showing the interior side of the opposite lever-arm and the bifurcated conductor through which the fertilizer passes after being discharged from the hopper or receptacle containing it; Fig. 6 a detail under side plan view of the bottom of the corn or seed hopper or receptacle and its connecting mechanism; Fig. 7 a detail perspective view of the slide mechanism for discharging the fertilizer.

In the accompanying drawings A B represent the two lever-arms consisting preferably of flat strips of wood or other material and of any desirable thickness and provided at their upper ends with suitable handles *a*. These lever-arms may be of any suitable shape and construction, as may also the seed and fertilizer hoppers or receptacles C D respectively, which hoppers or receptacles are suitably connected to the lever-arms as shown. The hoppers or receptacles may be of any desirable material and of any preferred shape, and one or both may have a flaring top and provided with suitable hinged covers *b*, and are preferably detachably connected to the lever arms so that they can be removed for cleaning, but this is not essential when coupled with the other features of the invention hereinafter described.

To the lower extremity of the lever-arms A B are connected suitable blades E of the usual construction to open the soil previous to discharging the corn and fertilizer. The lever-arms are pivoted to side-plates F which form a hinged connection between the arms, said plates also serving to prevent the corn and fertilizer from passing out between the arm at the side thereof, the plates for this purpose extending down below the point of juncture between the arms and blades and below the discharge opening of the conductors through which the seed and fertilizer pass previous to being deposited upon the ground.

Upon the inner side of the lever-arm A is a central conductor G, for the passage of the corn from the hopper or receptacle C, and upon the inner side of the lever-arm B is the bifurcated conductor H for the passage of the fertilizer and its discharge upon each side of the corn when deposited.

The bottom I of the hopper or receptacle C is detachably connected thereto by means of pins *c* which pass through lugs *d* upon the sides of the hopper and lugs *e* upon the bottom thereof. Any suitable means may be used for detachably connecting the bottom to the hopper or receptacle, and similar means may be employed for connecting the bottom to the hopper or receptacle D if it should be found desirable. The bottom I is provided with a chute *f* which registers with an opening *g* in the lever-arm A, thus forming a passage for the corn from the hopper or receptacle C to the conductor G.

To the interior side of the hopper or receptacle C is a cap, cut off or apron *h* which overhangs and covers one or more of the pockets or perforations $i$ in the distributing disk K which receives the corn or seed. This disk K is located above the bottom I and has imparted to it a rotary motion through the medium of a suitable mechanism operated by the action of the lever-arms. This mechanism consists in part of a central shaft $k$ extending up loosely through the disk K and has a pin $l$, the ends in turn coming against one or the other of lugs $m$ upon the upper side of the disk. To the shaft $k$ at a point below the bottom I, is keyed a toothed or ratchet wheel L with which engages a suitable spring actuated pawl $n$ and a spring actuated dog M. The pawl is pivotally connected to the under side of the bottom I, and the dog M is pivotally attached to the pitman N, and to this pitman is pivoted one end of an operating lever O, which in turn is pivoted to the lever-arm B, as shown in Fig. 1. A support P is provided for the pitman N which also acts as a guide and stops to limit its motion in either direction.

The bottom R of the hopper or receptacle D has a discharge opening $o$ for the fertilizer, and on a line below the bottom is a bracket S detachably connected to the outer side of the lever-arm B, which bracket forms a support for the slide T. This bracket S has a bottom and two sides which form both a guide and support for the slide T, said slide receiving and carrying the fertilizer to the conductor H and depositing it therein. It is necessary to regulate the size of the opening in the slide to adapt it to the desired quantity of fertilizer to be discharged at every deposit of corn or seed. I provide therefore a suitable gage U which is adjustable within the opening in the slide T and adjusted by means of a screw-rod $r$ which extends through the slide and engages with a screw threaded hole in the gage, so that by turning the screw rod in the proper direction the opening in the slide will be contracted or enlarged. The slide T is attached to the lever-arm A by a flexible link connection $s$ so that the lever-arms may be operated without any strain on the slide. When the lever-arms are brought together and separated, this motion will cause the corn or seed and the fertilizer to be deposited upon the ground as is common in this class of hand planters and fertilizer distributers, and therefore any further description in detail of the operation, is considered unnecessary.

In place of having the hoppers or receptacles for the corn or seed and the fertilizer upon different horizontal planes as shown, both may be connected to the lever-arms so that their upper ends will be on line with each other, this change being left entirely with the manufacturer, and any such changes or modifications in the details of construction as would come within ordinary mechanical skill, I reserve the right to make without departing from the spirit of my invention.

Having now fully described my invention, what I claim as new, and desire to secure by Letters Patent, is—

A hand corn planter, consisting of two hinged lever-arms having seed and fertilizer hoppers respectively and suitable conductors, a gage to regulate the discharge of the fertilizer, and means for automatically discharging the corn, consisting of a perforated disk, a central shaft connecting therewith and provided with a ratchet upon its lower end, a spring actuated dog and a guide upon the bottom of the hopper, a pitman connecting the shaft with the operating lever, said pitman carrying a spring actuated pawl, and the lever connecting with one of the hinged lever-arms, substantially as and for the purpose set forth.

In testimony that I claim the above I have hereunto subscribed my name in the presence of two witnesses.

LEE MIDDLETON.

Witnesses:
J. L. CARROLL,
T. S. McQUEEN.